A. T. DAWSON & G. T. BUCKHAM.
SIGHTING APPARATUS FOR ORDNANCE.
APPLICATION FILED MAY 22, 1908.
922,397.
Patented May 18, 1909.
2 SHEETS—SHEET 1.
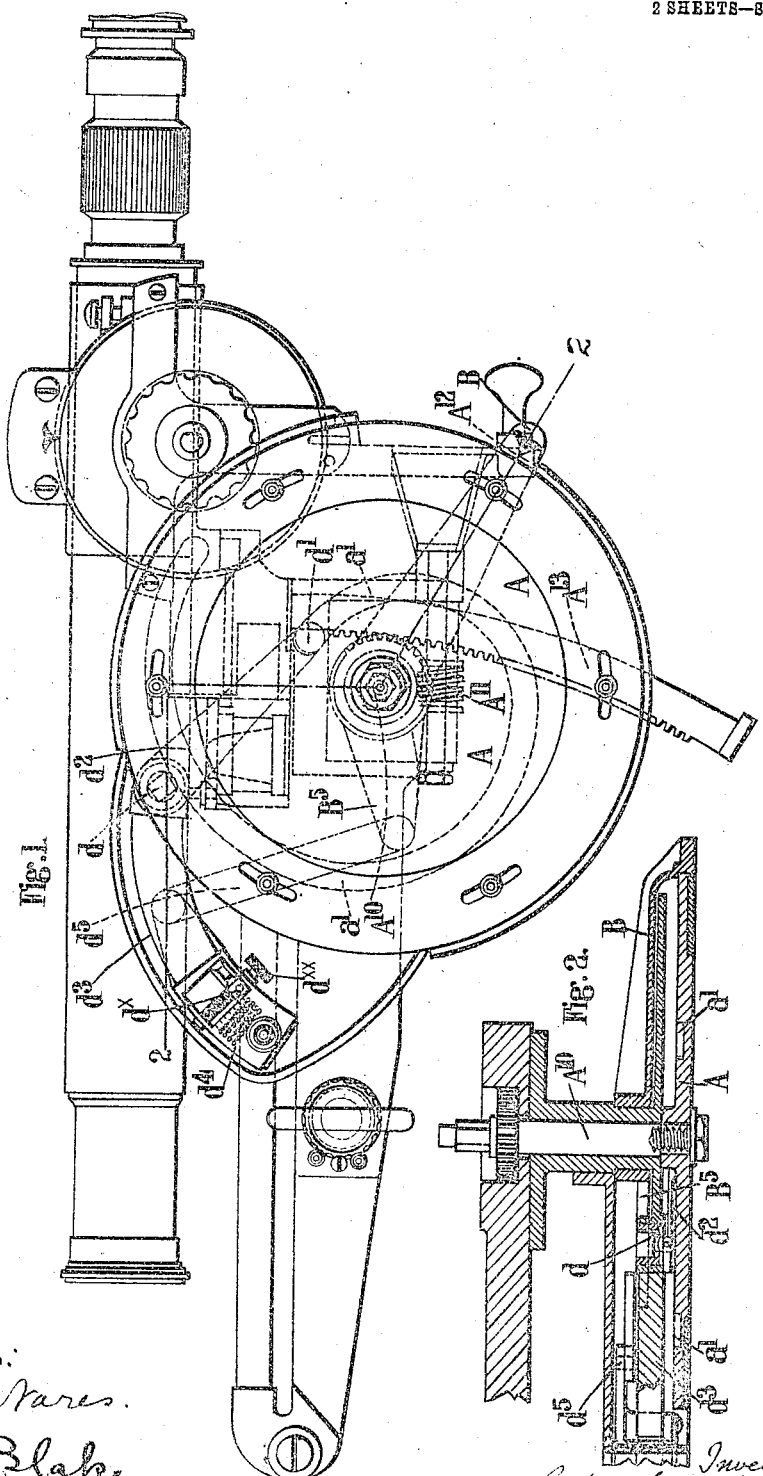

A. T. DAWSON & G. T. BUCKHAM.
SIGHTING APPARATUS FOR ORDNANCE.
APPLICATION FILED MAY 22, 1908.
922,397.
Patented May 18, 1909.
2 SHEETS—SHEET 2.
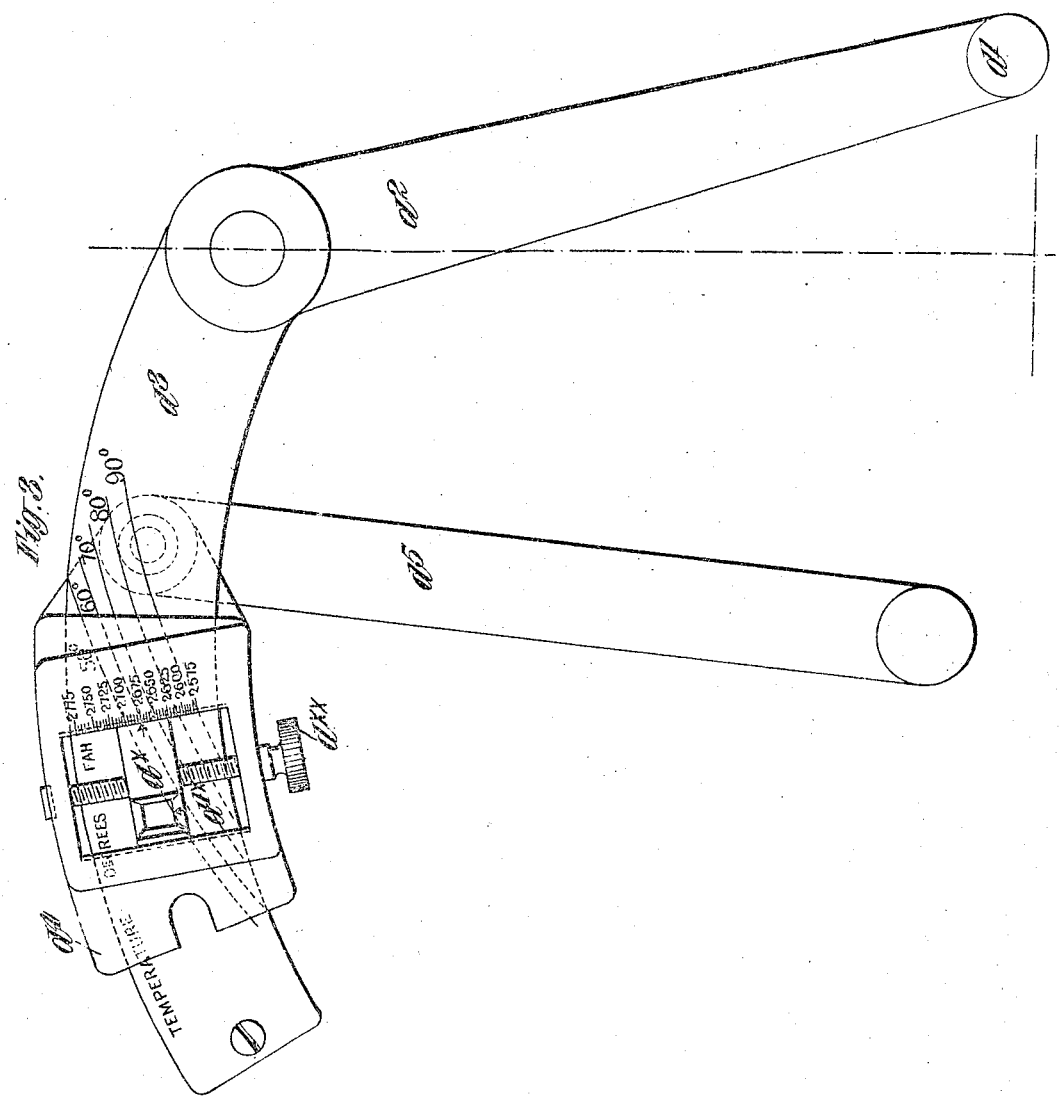

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF WESTMINSTER, ENGLAND.

SIGHTING APPARATUS FOR ORDNANCE.

No. 922,397.  Specification of Letters Patent.  Patented May 18, 1909.

Original application filed October 23, 1907, Serial No. 398,717. Divided and this application filed May 22, 1908. Serial No. 434,230.

*To all whom it may concern:*

Be it known that we, ARTHUR TREVOR DAWSON, lieutenant Royal Navy, director and superintendent of Ordnance Works, and GEORGE THOMAS BUCKHAM, engineer, both subjects of the King of Great Britain, residing at 32 Victoria street, Westminster, in the county of London, England, have invented certain new and useful Improvements Relating to Sighting Apparatus for Ordnance, of which the following is a specification.

This invention relates to sighting apparatus of the kind in which there is a range dial and a pointer so arranged that in imparting angular displacement of the dial relatively to the pointer the proper elevation will be given to the sight to accord with a particular range.

We have already devised sighting apparatus in which a graduated dial is moved by hand gearing relatively to the pointer for setting the sight for different ranges, means being provided whereby in the act of setting the range dial relatively to the pointer, a correction will be automatically made to compensate for alterations in the muzzle velocity and changes in the temperature of the charges by changing the position of the pointer, so that in setting the range dial a greater or less angular movement will be imparted to the dial in bringing a particular graduation or mark thereon into coincidence with the pointer. These compensating means we term a "calibrating" device.

It is the chief object of our present invention to modify the construction of the said calibrating device.

Our present invention is particularly, although not exclusively, intended for use with duplex sights of the well known cross-connected kind.

We will describe our invention with reference to the accompanying drawings, in which:—

Figures 1 to 3 illustrate the improved form of calibrating device combined with sighting apparatus in which the correction is effected by an angular movement imparted to the pointer through the calibrating device when the range dial receives its movement from the hand gearing; Fig. 1 being a side elevation of the apparatus; Fig. 2 a horizontal section taken approximately on the line 2—2 of Fig. 1, and Fig. 3 a detail of the apparatus to an enlarged scale.

A is the range dial attached to a spindle $A^{10}$ which is actuated by worm gearing $A^{11}$ operated from a hand wheel $A^{12}$ in the usual manner, the said spindle $A^{10}$ carrying the elevating pinion for changing the elevation of the sight through the usual elevating rack $A^{13}$.

B is the pointer.

The said calibrating device, comprises the cam or spiral groove $a'$ formed on or in the range dial for actuating the roller $d'$ situated at the end of one arm $d^2$ of the bell crank lever which is adapted to swing about an axis or bearing $d$ on the dial casing. The other arm $d^3$ of the bell crank lever has the sliding or adjustable piece or block $d^4$, which is adapted to be shifted and secured in any desired position on this arm. This arm bears a graduated scale for enabling the block $d^4$ to be set in the proper position thereon as required for the change in charge temperature. The angularly adjustable pointer B is provided with an arm or extension $B^5$ which by means of the link or rod $d^5$ is connected with the sliding block $d^4$. The said block is also provided with an adjustable member or pointer $d^x$ working adjacent to a graduated scale on the block for enabling the said adjustable member or pointer $d^x$ to be set, by the actuation of a milled head $d^{xx}$, in the proper position for effecting the corrections required for the change in muzzle velocity. The face of the arm $d^3$ (Fig. 3) may be provided with temperature curves which are carefully calculated to give the correct position for the sliding block $d^4$.

When the range dial is actuated by the hand wheel $A^{12}$ in the ordinary manner to bring the desired graduation thereon into correspondence with the pointer B, the cam or spiral groove $a'$ of the dial also imparts movement to the bell-crank lever $d^2$ $d^3$ which in turn imparts angular movement to the pointer through the said connecting link $d^5$ and the arm or extension $B^5$ on the pointer, the amplitude of the angular movement imparted to the pointer depending upon the position of the said sliding block $d^4$ on the arm $d^3$ of the bell crank lever and the extent of rotation imparted to the range dial by the hand wheel $A^{12}$. If the block is moved inward toward the pivot $d$ of the bell crank lever, so as to bring the center of the contiguous end of the connecting link $d^5$ into coincidence with the center of the pivot $d$ of the bell crank lever, the motion imparted to the bell-crank lever by the dial cam or spiral groove $a'$ will not affect the position of the pointer B. If however the sliding block be moved outward or away from the pivot $d$ of the bell-crank lever, the motion imparted to the latter by the dial cam or spiral groove will be transmitted to the pointer B through the said link $d^5$ to a greater or less extent according to the distance the sliding block has been shifted from the pivot of the bell-crank lever. Thus the elevation given to the sight during the movement of the range dial in bringing the desired graduation into correspondence with the pointer will be increased to an extent depending upon the position to which the pointer is set by the calibrating device. The requisite correction for the fall in the muzzle velocity and the change in charge temperature will therefore be automatically effected. To correct for muzzle velocity and charge temperature the member $d^x$ is first set to the muzzle velocity scale and then the sliding block $d^4$ is moved along the arm $d^3$ until the arrow $d'^x$ on the member $d^x$ touches the required temperature curve. Fig. 3 shows the calibrating device set for a muzzle velocity of 2675 feet per second and a charge temperature of 50 degrees Fahrenheit.

What we claim and desire to secure by Letters Patent of the United States is:—

1. In sighting apparatus for guns, the combination with the range dial and its index or pointer, of hand actuated means for setting the range dial with respect to the pointer and changing the elevation of the sights, a double armed or bell crank lever of which one arm or member engages with a cam or spiral groove of the range dial, an adjustable piece mounted on the other arm or member of said lever, and means whereby the position of the adjustable piece affects the extent of movement imparted to the pointer during the hand setting operation.

2. In sighting apparatus for guns, the combination with the range dial and its index or pointer, of hand actuated means for setting the range dial with respect to the pointer and changing the elevation of the sights, a double armed or bell crank lever of which one arm or member engages with a cam or spiral groove of the range dial an adjustable piece mounted on the other arm or member of the said lever and connected with the pointer by means whereby the angular position of the pointer will be varied in accordance with the position of the adjustable piece and the degree of motion imparted to the range dial during the setting of the sights by the hand actuated means.

In testimony whereof we have hereunto set our hands in presence of two subscribing witnesses this eighth day of May 1908.

ARTHUR TREVOR DAWSON.
GEORGE THOMAS BUCKHAM.

Witnesses:
HENRY KING,
ARCHIE H. NICHOLS.